(12) United States Patent
Szolyga

(10) Patent No.: US 7,359,190 B2
(45) Date of Patent: Apr. 15, 2008

(54) INTERFACE FOR EXPANSION MODULE AND EXPANSION MODULE BAY

(75) Inventor: Thomas H. Szolyga, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 348 days.

(21) Appl. No.: 10/836,338

(22) Filed: May 3, 2004

(65) Prior Publication Data

US 2005/0243508 A1      Nov. 3, 2005

(51) Int. Cl.
*H05K 7/00*     (2006.01)

(52) U.S. Cl. .................... 361/686; 361/685; 439/928.1

(58) Field of Classification Search ............... 361/686, 361/685; 439/76.1, 378, 928.1
See application file for complete search history.

(56) References Cited

U.S. PATENT DOCUMENTS

| | | | | |
|---|---|---|---|---|
| 5,065,262 A | * | 11/1991 | Blackborow et al. | 360/75 |
| 5,963,422 A | * | 10/1999 | Golobay et al. | 361/686 |
| 5,986,889 A | * | 11/1999 | Chang | 361/725 |
| 6,052,278 A | * | 4/2000 | Tanzer et al. | 361/685 |
| 6,064,566 A | | 5/2000 | Agata et al. | |
| 6,351,394 B1 | * | 2/2002 | Cunningham | 361/818 |
| 6,452,787 B1 | * | 9/2002 | Lu et al. | 361/683 |
| 6,456,492 B1 | * | 9/2002 | Wang et al. | 361/686 |
| 6,473,297 B1 | * | 10/2002 | Behl et al. | 361/685 |
| 6,496,362 B2 | * | 12/2002 | Osterhout et al. | 361/685 |
| 6,560,099 B1 | * | 5/2003 | Chang | 361/685 |
| 6,563,701 B1 | * | 5/2003 | Peng et al. | 361/685 |
| 6,719,591 B1 | * | 4/2004 | Chang | 439/638 |
| 6,724,621 B1 | * | 4/2004 | Liang | 361/685 |
| 6,888,727 B2 | * | 5/2005 | Chang | 361/752 |
| 6,891,721 B2 | * | 5/2005 | Huang | 361/685 |
| 7,012,805 B2 | * | 3/2006 | Shah et al. | 361/685 |
| 2001/0001529 A1 | | 5/2001 | Behl et al. | |
| 2003/0099094 A1 | | 5/2003 | Coles et al. | |
| 2004/0242064 A1 | * | 12/2004 | Chang et al. | 439/564 |

FOREIGN PATENT DOCUMENTS

| | | |
|---|---|---|
| EP | 0426414 A2 | 5/1991 |
| WO | 2004017159 A | 2/2004 |

OTHER PUBLICATIONS

European Search Report of Patent Application No. 05252742 mailed Oct. 11, 2007.

* cited by examiner

*Primary Examiner*—Jayprakash N Gandhi
*Assistant Examiner*—Ingrid Wright

(57) ABSTRACT

An expansion module including a housing having an interior, an end cap connected to the housing at one end, and an interface device positioned in the housing interior is described. The end cap includes at least two throughholes to the housing interior and at least two alignment receptacles. The interface device receives a) a standard data connector via a end cap throughhole and b) a power connector via another end cap throughhole. The interface device includes an expansion device connector internal to the housing interior for providing at least one of data and power to an expansion device. An expansion module bay including a module sleeve having an opening for receiving the expansion module is described. The expansion module bay further includes a connector connected to an end of the module sleeve for connecting to the received expansion module, and a door covering the module receiving opening.

28 Claims, 7 Drawing Sheets

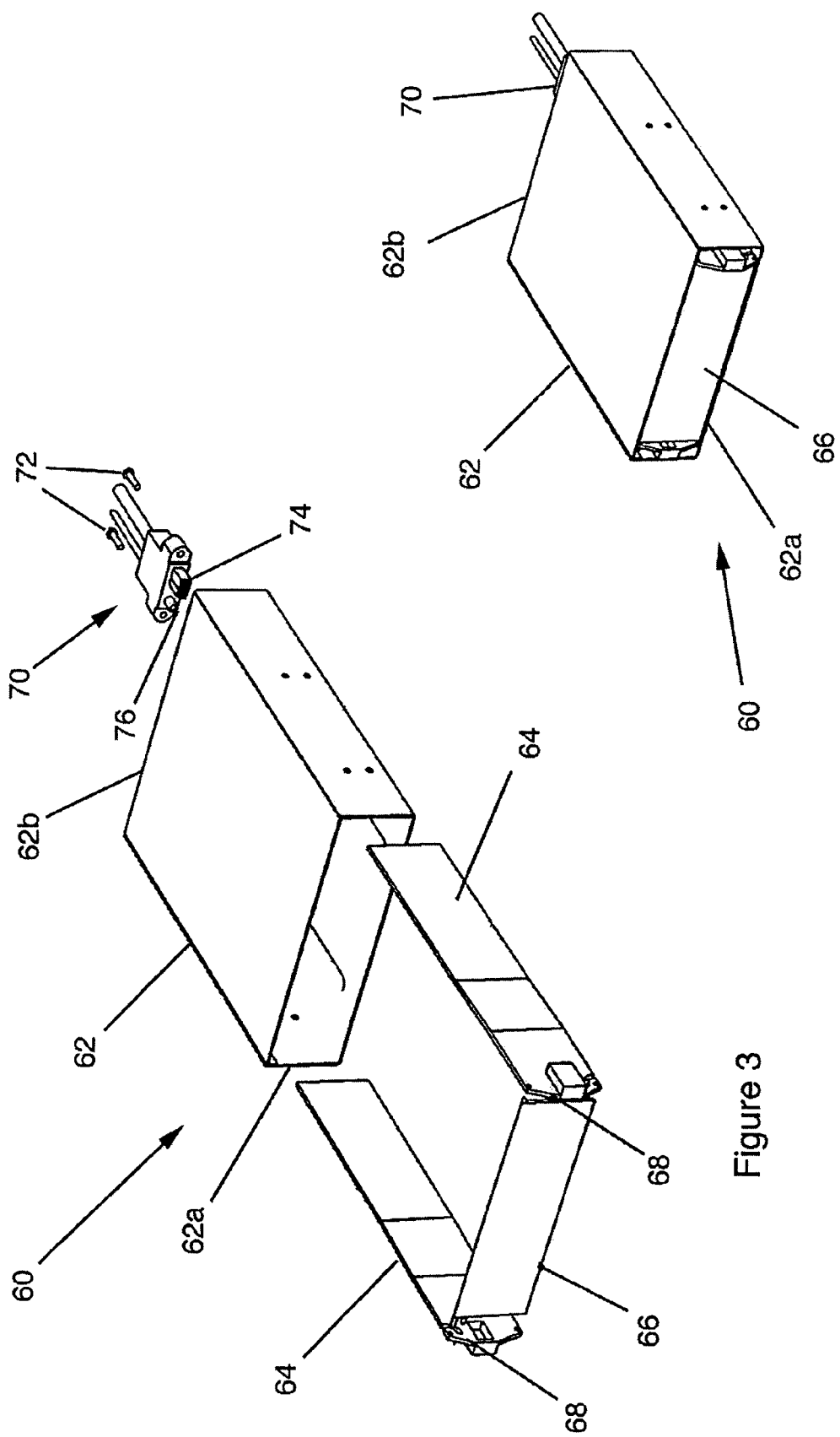

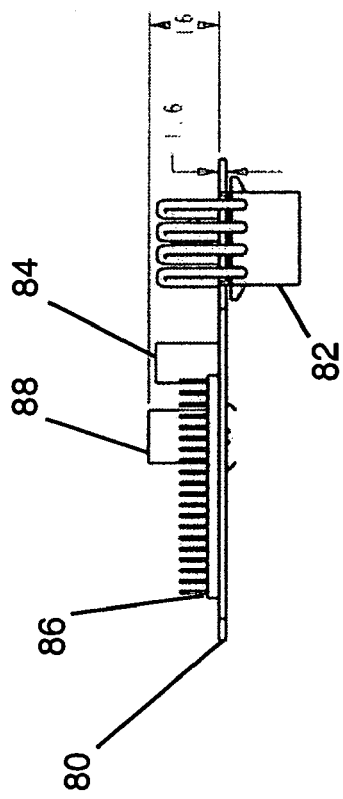
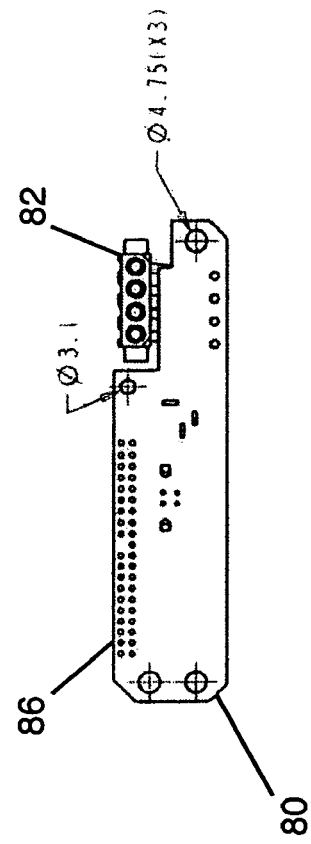
Figure 9
Figure 10
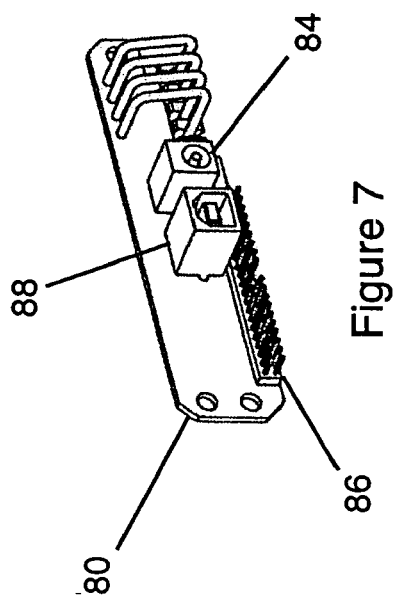
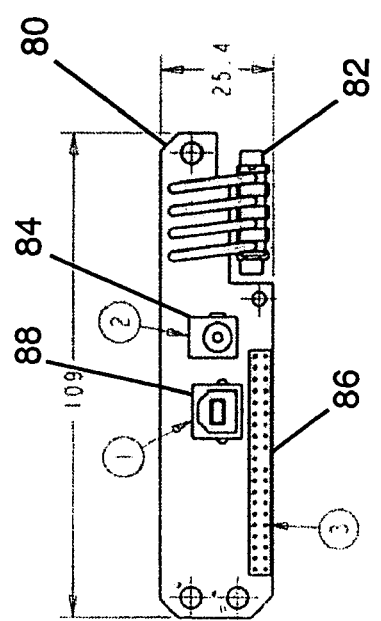
Figure 7
Figure 8

INTERFACE FOR EXPANSION MODULE AND EXPANSION MODULE BAY

RELATED APPLICATIONS

This application is related to each of the following applications: "Removable Information Storage Device Enclosure," filed on May 3, 2004 Ser. No. 10/836,340, "Removable Expansion Module Usable as Internal and External Device," filed on May 3, 2004 Ser. No. 10/836,344, and "Removable Expansion Module Latch System," filed on May 3, 2004 Ser. No. 10/836,342, each assigned to the present assignee, all of which are hereby incorporated by reference in their entirety, and all of which are being filed concurrently herewith.

FIELD OF THE INVENTION

The present invention relates to an interface for an expansion module and expansion module bay.

BACKGROUND

It is known in the art to use internal volume in a computer system to connect additional storage devices, e.g., hard drives, for the computer system. The additional storage device connection process requires tools and knowledge regarding opening the computer system and adding/replacing existing storage device. Most users of computer systems are incapable or uncomfortable with opening up a computer system to add additional devices. Most frequently, additional devices are only added by the computer system manufacturer.

Additionally, knowledge of different connectors for data signals and power is required by the user or technician and different computer systems require different, and at times incompatible and custom, connectors for data signals and power.

External storage devices using standard USB connectors to connect to external standard USB connectors on computer systems are used by user to connect additional storage devices; however, these external storage devices require the use of additional cables for both power and data signals and oftentimes an additional power transformer for providing power to the external storage device. The external nature of these devices and the associated cabling and power requirements contributes to a cluttered and potentially hazardous environment surrounding the computer system. Users trip over cabling potentially injuring themselves or causing damage to the external storage device or computer system connected at one end of the cable.

SUMMARY

The present invention provides an expansion module including a housing having an interior, an end cap connected to the housing at one end, and an interface device positioned in the housing interior. The end cap includes at least two throughholes to the housing interior and an alignment receptacle. The interface device receives a) a standard data connector via a end cap throughhole and b) a power connector via another end cap throughhole. The interface device includes an expansion device connector internal to the housing interior for providing at least one of data and power to an expansion device.

An expansion module bay for receiving the expansion module includes a module sleeve having an opening for receiving an expansion module at least partially into the interior of the module sleeve. The expansion module bay further includes a connector connected to one end of the module sleeve for connecting to the received expansion module and a door covering the module receiving opening of the module sleeve.

Still other advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

DESCRIPTION OF THE DRAWINGS

The present invention is illustrated by way of example, and not by limitation, in the figures of the accompanying drawings, wherein elements having the same reference numeral designations represent like elements throughout and wherein:

FIG. 3 is an exploded schematic view of an expansion module bay according to an embodiment of the present invention;

FIG. 4 is a front perspective view of the assembled expansion module bay of FIG. 3;

FIG. 7 is a perspective view of an interface card depicted in FIG. 6;

FIG. 8 is an end on view of one side of the interface card of FIG. 7;

FIG. 9 is a bottom view of the interface card of FIG. 7;

FIG. 10 is an end on view of another side of the interface card of FIG. 7.; and, FIG. 11 is a perspective view illustrating an expansion device being placed into an expansion module.

DETAILED DESCRIPTION

In contrast with the above-described approaches, the mechanism of the present invention provides an expansion module for easily changing and/or increasing the capabilities of a computer system.

An embodiment of the present invention is described with reference to use in conjunction with the expansion module and expansion module bay of co-pending U.S. patent applications entitled, "Removable Information Storage Device Enclosure," filed on May 3, 2004, "Removable Expansion Module Usable as Internal and External Device," filed on May 3, 2004 and "Removable Expansion Module Latch System," filed on May 3, 2004, all assigned to the present assignee, and hereby incorporated by reference in their entirety herein. However, it is to be understood that the present invention is applicable to other different configurations.

Figure 1:
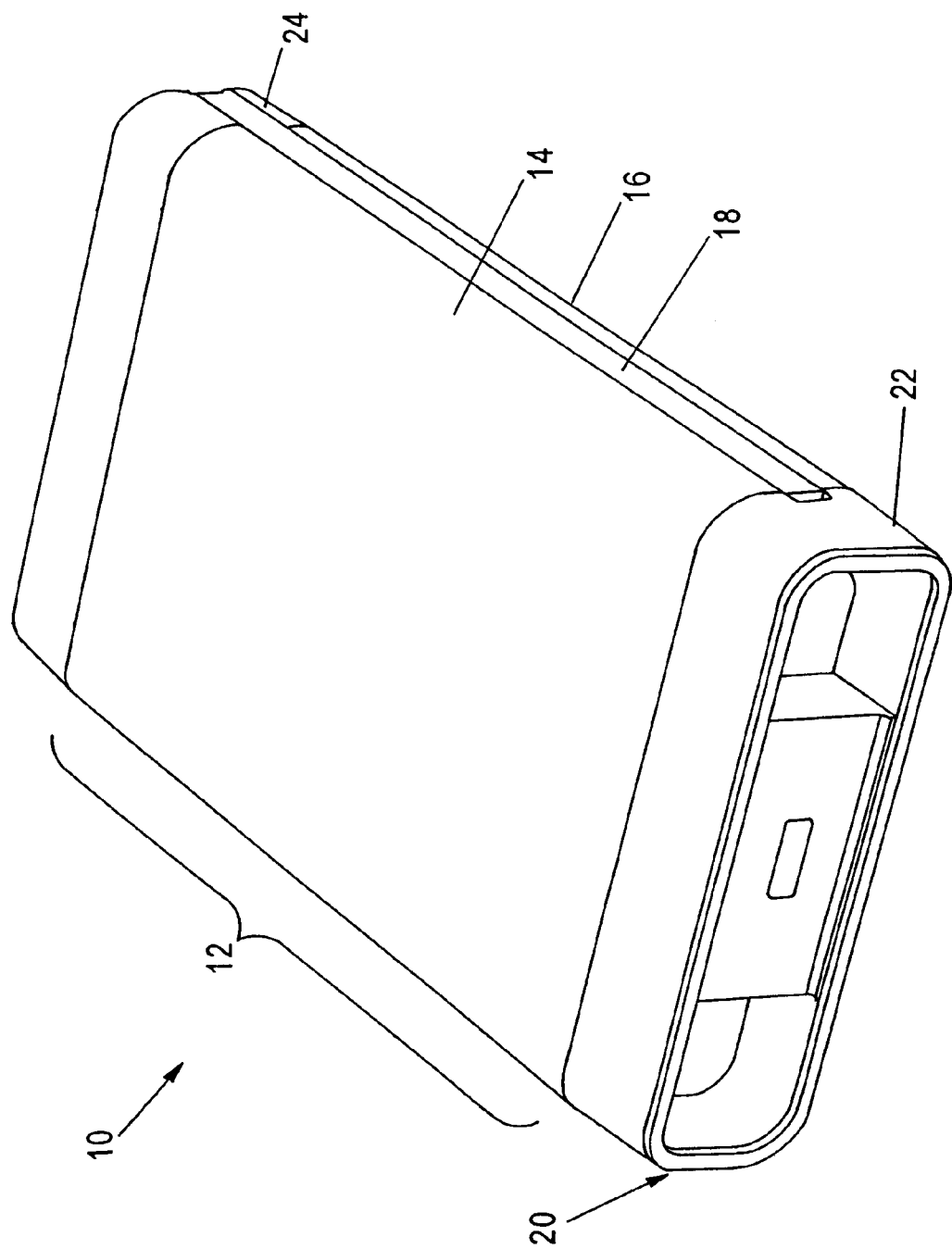
FIG. 1 is a front perspective view of an expansion module according to an embodiment of the present invention.

FIG. 1 depicts an expansion module 10 according to an embodiment of the present invention. Expansion module 10 is a rounded rectangular enclosure for receiving an expansion device (not shown), e.g., a hard disk drive.

Expansion module 10 includes a housing 12 made up of an upper rectangular channel 14 having a generally U-shaped cross-section connected to a lower rectangular channel 16 having a generally U-shaped cross-section to form a rounded rectangular enclosure having a rounded rectangular opening at each end. A pair of C-shaped connecting strips 18, 20 (visible in FIG. 2) join the open ends of the U-shaped channels 14, 16 to each other. C-shaped connecting strips 18, 20 and the mechanism for joining U-shaped channels 14, 16 are more fully described in co-pending U.S. patent application titled, "Removable Hard Drive Enclosure Construction", and assigned to the instant assignee, the entirety of which is hereby incorporated by reference herein in its entirety.

In one embodiment, upper rectangular channel 14 and lower rectangular channel 16 are made of a thermally conductive material to assist in removing heat from within the expansion module 10.

A first end cap 22, having a rounded rectangular cross-section similar to housing 12, attaches at one open end of housing 12 closing the opening. End cap 22 closes the open end of housing 12 to prevent entry of dust and other contaminants and retain expansion device (not shown) within the housing 12 interior. In one embodiment, end cap 22 includes a mechanism for removing expansion module 10, e.g., a hand or finger grip, from an expansion module bay (FIG. 3) described in detail below.

In one embodiment, end cap 22 attaches to one of rectangular channels 14, 16 and the other rectangular channel 16, 14 attaches to the first rectangular channel via connecting strips 18, 20, as described above. In this manner, end cap 22 need not be removed in order to access housing 12 interior.

A second end cap 24, having a rounded rectangular cross-section similar to housing 12 and first end cap 22, attaches at the other open end of housing 12 at the distal end from end cap 22 thereby closing both openings of the housing. End cap 24, described in further detail in conjunction with FIG. 2 below, closes the open end of housing 12 to minimize entry of dust and other contaminants and retain expansion device (not shown) within the housing 12 interior.

In one embodiment, end cap 24 attaches to one of rectangular channels 14, 16 and the other rectangular channel 16, 14 attaches to the first rectangular channel via connecting strips 18, 20, as described above. In this manner, end cap 24 need not be removed in order to access housing 12 interior.

An outer face 26 of end cap 24, in a plane parallel with the open end of housing 12 covered by end cap 24, includes a data connector opening 30, a power connector opening 32, a first alignment receptacle 34, and a second alignment receptacle 36 for connecting with the expansion module bay (FIG. 3). Data connector opening 30 and power connector opening 32 define a throughhole in outer face 26 enabling a connection from module exterior to interior. As depicted in FIG. 3, data connector opening 30 is sized to fit a standard USB Type B data connector and power connector opening 32 is sized to fit a standard DC power connector, each known to persons skilled in the art.

In one embodiment, openings 30, 32 are sized to enable an appropriate connector, i.e., USB Type B data connector and power connector, from expansion module bay to pass through the opening and mate with the corresponding connector within housing 12. That is, connectors within housing 12 do not protrude beyond outer face 26.

First alignment receptacle 34 and second alignment receptacle 36 define substantially cylindrical depressions inward to interior of module 10 from outer face 26 for receiving a corresponding pair of spaced alignment pins from the expansion module bay (FIG. 3). Alignment receptacles 34, 36 receiving alignment pins from the expansion module bay aligns module 10 in position within the module bay thereby aligning data connector opening 30 and power connector opening 32 with the data connector and power connector from the module bay.

In one embodiment, alignment receptacles 34, 36 extend farther than the greater depth of either connector associated with data connector opening 30 and power connector opening 32. That is, alignment receptacles 34, 36 receive alignment pins from the module bay prior to data connector opening 30 or power connector opening 32 receiving a connector from the module bay.

In another embodiment, alignment receptacles 34, 36 are positioned non-equi-distant along the outer face 26. That is, first alignment receptacle 34 is positioned closer to one of the left or right edges of outer face 26 (viewing end cap 24 end on) than second alignment receptacle 36 is positioned with respect to either of the left or right edges. In another embodiment, alignment receptacles 34, 36 are positioned non-equi-distant top-to-bottom along the outer face 26.

Figure 2:
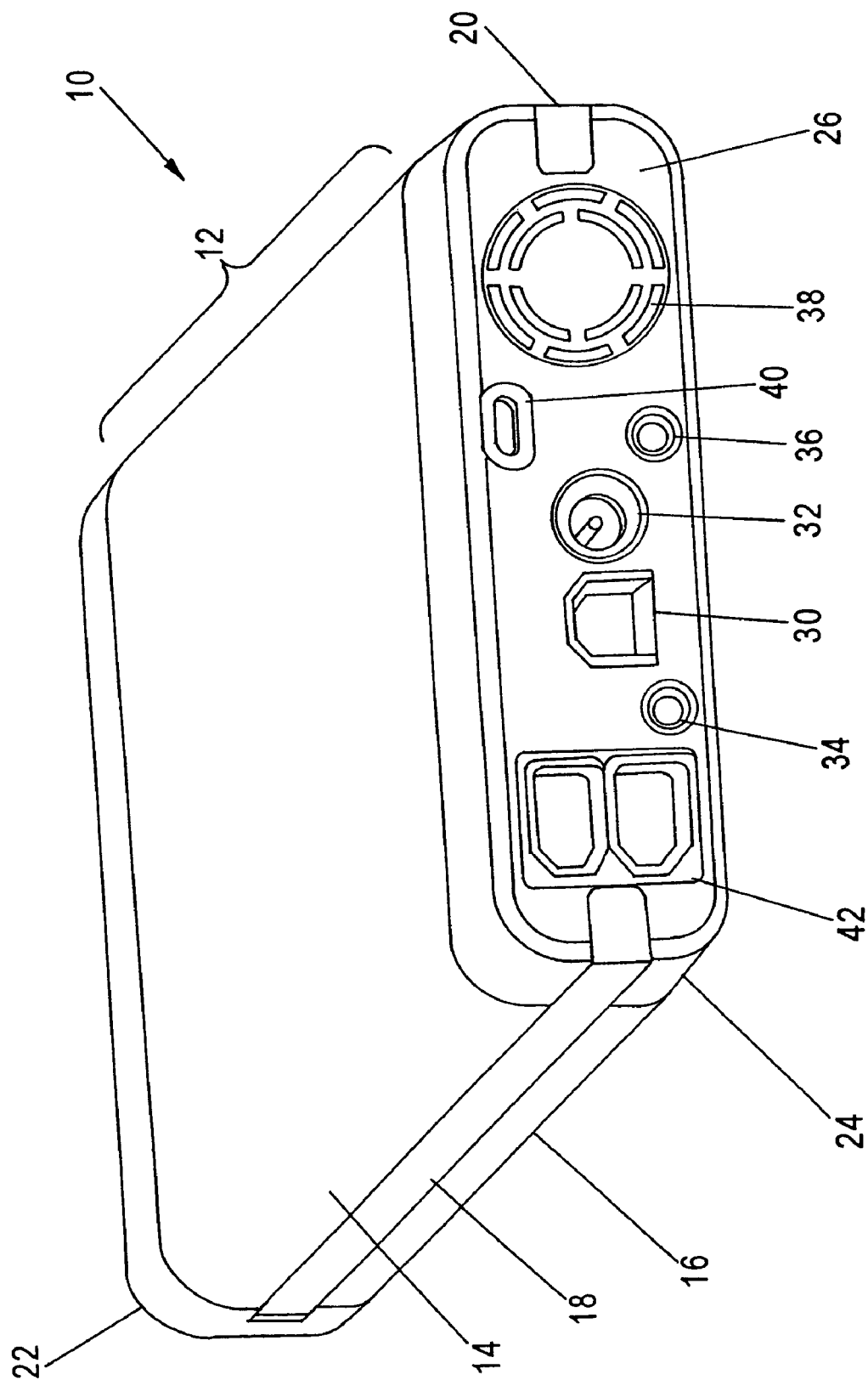
FIG. 2 is a rear perspective view of the expansion module of FIG. 1.

In one embodiment, a cooling device opening 38 depicted in FIG. 2 defines a throughhole from module 10 exterior to interior enabling a cooling device, e.g., a fan, positioned within module 10 to remove warm air from the module 10 interior thereby cooling expansion device (not shown). Cooling device opening 38 is a size and shape to fit on the outer face 26 of end cap 24 and enable sufficient air flow for assisting in cooling expansion device (not shown).

In one embodiment, a lock opening 40 depicted in FIG. 2 defines a throughhole from module 10 exterior to interior enabling insertion of a locking device, e.g., a cable lock such as a Slim Microsaver Security Cable available from Kensington Technology Group. Lock opening 40 may be used to secure module 10 in a particular location using a cable lock or to secure module 10 within expansion module bay 60 (FIG. 3).

In one embodiment, a pair of second data openings 42 depicted in FIG. 2 define throughholes in outer face 26 enabling a connection from module 10 exterior to interior. As depicted in FIG. 2, second data openings 42 are sized to fit a pair of second data connectors, e.g., IEEE 1394 connectors.

FIG. 3 depicts an exploded parts diagram of an expansion module bay 60 according to an embodiment of the present invention for receiving the above-described expansion module 10. Module bay 60 includes an elongated parallelepiped module sleeve 62 having a front opening 62a in one face and a rear face 62b for receiving connectors from a computer system (not shown). Front opening 62a is sized to receive expansion module 10 to the interior of module bay 60.

A pair of rectangular bay guides 64 are positioned on opposite interior walls of module bay 60 and assist by guiding the insertion of module 10. A bay door 66 substantially covers front opening 62a of module bay 60. Bay door 66 attaches rotatably to bay guides 64 at either end of the door and remains in place over front opening 62a by the force of twin springs 68 each mounted at the end of bay guides 64. Module 10 insertion force moves bay door 66 upward by contact with a leading edge of the module.

Module bay 60 is mounted within a standard drive bay of a computer system (not shown) via standard mounting hardware and a connector 70 connects to rear face 62b to provide data and power connections to module 10 when inserted in bay 60. Connector 70 includes a pair of alignment pins 72, a data connector 74, and a power connector 76. Alignment pins 72 protrude through connector 70 securing the connector to rear face 62b. Alignment pins 72 continue through rear face 62b and insert into alignment receptacles 34, 36 upon insertion of module 10 into module bay 60.

Figure 5:
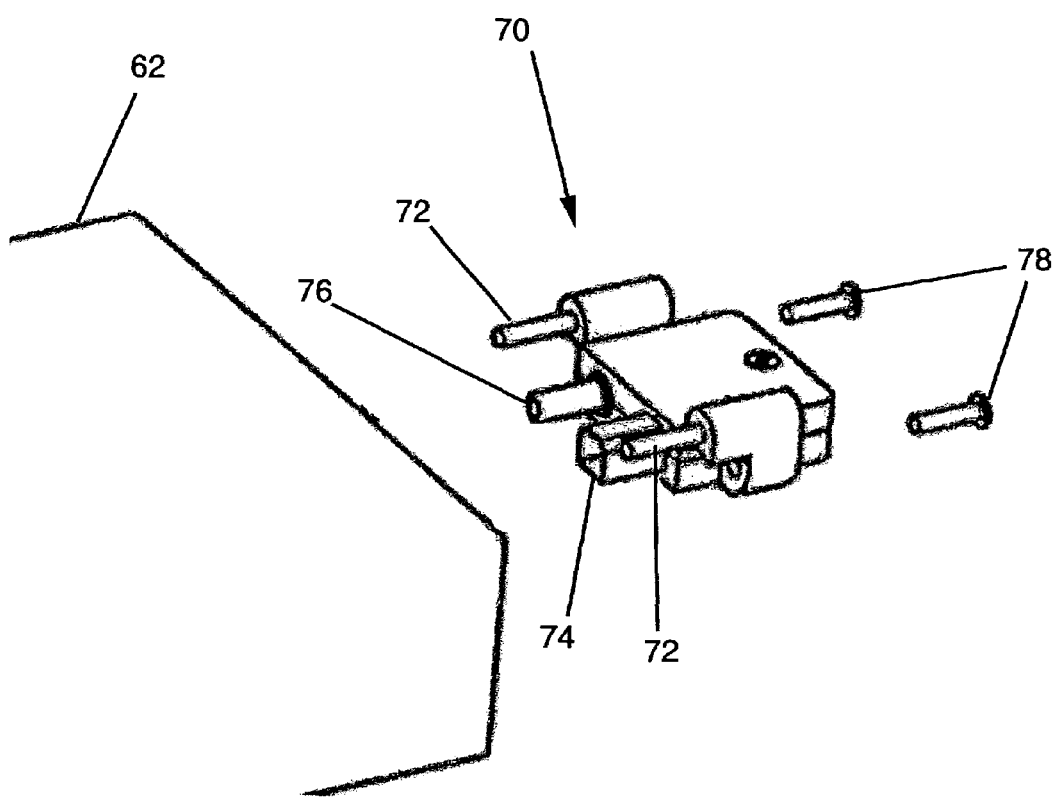
FIG. 5 is a detailed view of another embodiment of the connector of FIG. 3 according to an embodiment of the present invention.

In one embodiment according to the present invention as depicted in FIG. 5, alignment pins 72 are replaced with a fastening device 78, e.g., one or more screws or rivets, to attach connector 70 to rear face 62b of module bay 60. In this embodiment, alignment pins 72 are separately attached to connector 70 and protrude through rear face 62b for insertion into alignment receptacles 34, 36.

FIG. 4 depicts expansion module bay 60 in a fully assembled condition, having connector 70 attached to rear face 62b, and bay door 66 in a closed position.

Figure 6:
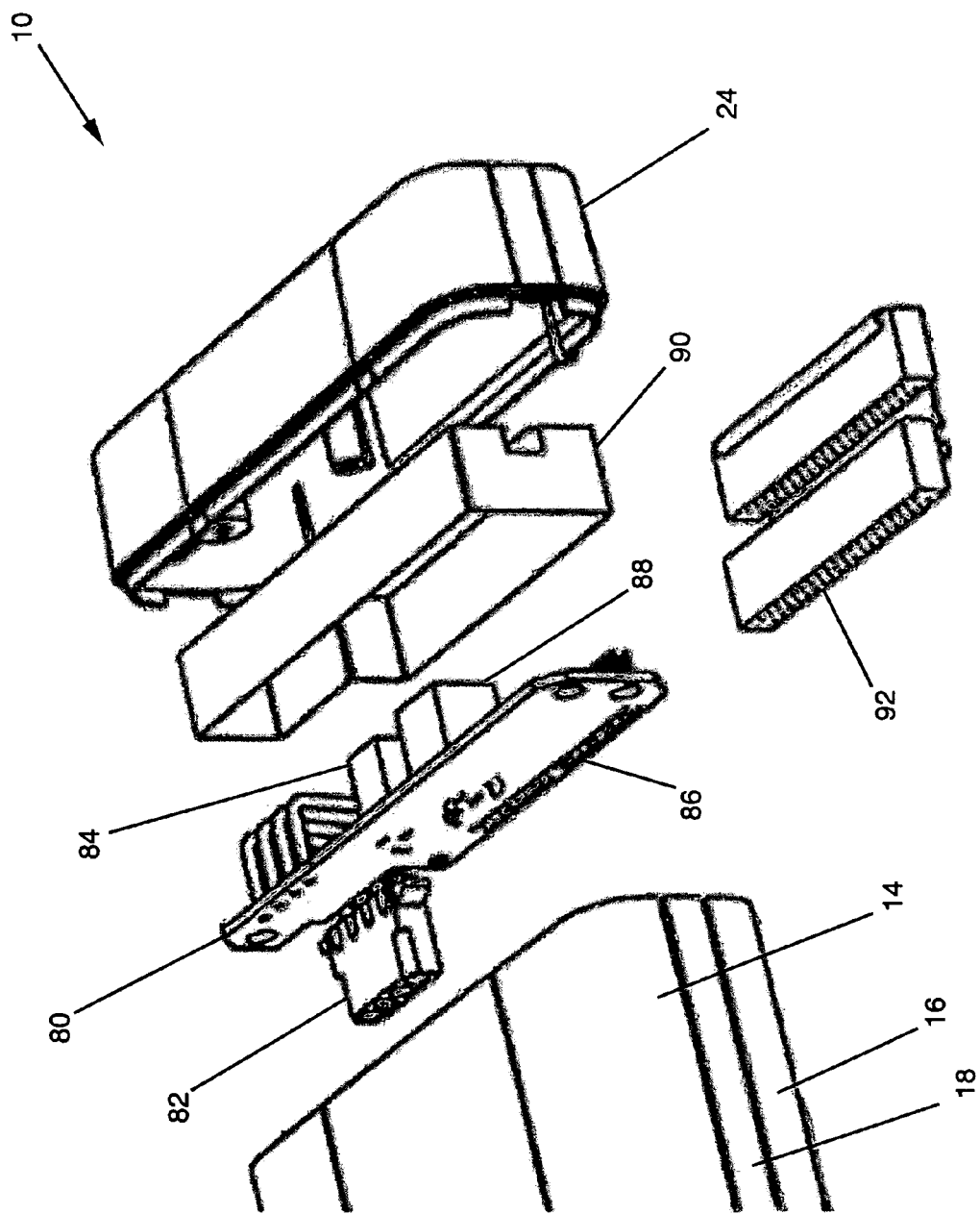
FIG. 6 is an exploded schematic view of a portion of an expansion module according to an embodiment of the present invention.

FIG. 6 depicts an exploded parts diagram of one end of module 10 near end cap 24. An interface card 80 includes one or more electronic components (not shown) for connecting an expansion device (not shown) positioned within housing 12 to connectors, e.g., connector 70, external to expansion module 10. Interface card 80 includes an expansion device power connector 82 for connecting to and providing power to the expansion device and a power connector receptacle 84 for receiving a power connector, e.g., power connector 76, external to expansion module 10. Interface card 80 further includes an expansion device data connector 86 for connecting to and transmitting/receiving signals to/from expansion device and a data connector receptacle 88 for connecting to and transmitting/receiving signals to/from a data connector, e.g., data connector 74, external to expansion module 10. Data connector receptacle 88 is a standard USB Type B data connector reducing design and manufacturing costs and increasing compatibility with external data connectors apart from module bay 60.

Power connector receptacle 84 and data connector receptacle 88 are positioned to align with power connector opening 32 and data connector opening 30, respectively, in outer face 26 of end cap 24.

Interface card 80 is sized to fit within an electromagnetic shield 90 within end cap 24 to protect the electronic components from possible interference and to limit or minimize electromagnetic emissions from interface card 80.

An optional data cable 92 depicted in FIG. 6 connects at one end to expansion device data connector 86 and at another end to the expansion device within expansion module 10.

FIGS. 7-10 depict differing views of interface card 80. FIG. 7 is a perspective view of interface card 80, FIG. 8 is an end on view of one side of interface card 80, FIG. 9 is a bottom view of interface card 80, and FIG. 10 is an end on view of another side of interface card 80.

Figure 11:
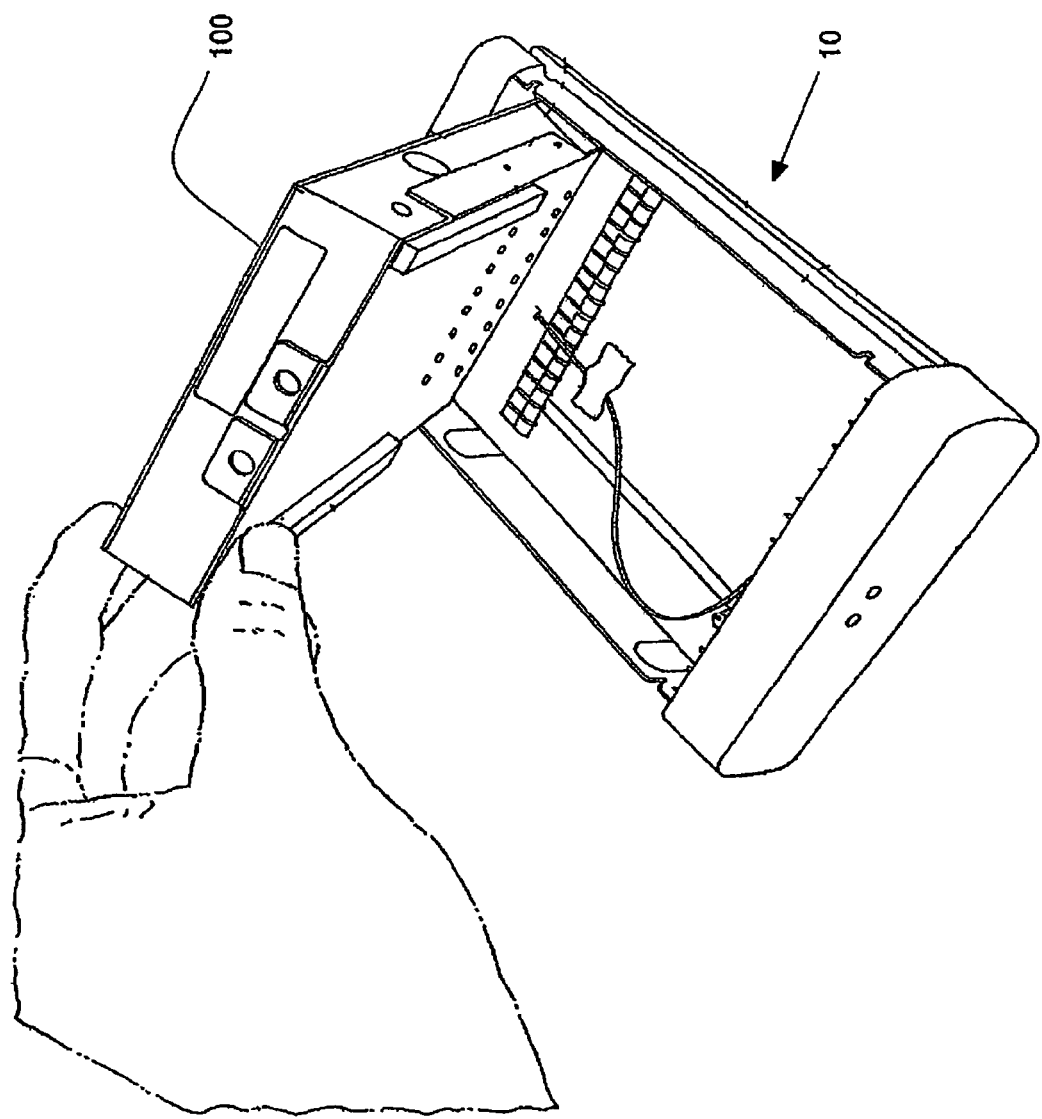

It will be readily seen by one of ordinary skill in the art that the present invention fulfills all of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof. FIG. 11 illustrates an expansion device 100 being placed into expansion module 10.

What is claimed is:

1. An expansion module, comprising:
a housing having an interior and an exterior;
an end cap connected to the housing at one end, wherein the end cap includes at least two throughholes to the interior of the housing and an alignment receptacle positioned adjacent to the at least two throughholes; and
an interface device positioned in the housing interior, wherein the interface device receives a) a standard data connector via one of the at least two throughholes of the end cap and b) a power connector via another of the at least two throughholes of the end cap, and wherein the interface device includes one or more expansion device connectors internal to the housing interior for providing at least one of data signals and power received from the standard data connector and the power connector to an expansion device.

2. The expansion module of claim 1, further comprising:
an expansion device positioned in the housing interior and connected to the expansion device connector of the interface device.

3. The expansion module of claim 2, wherein the expansion device is a storage device.

4. The expansion module of claim 3, wherein the storage device includes at least one of a hard disk drive, a floppy disk drive, a non-volatile memory device, a media reading drive, and a media writing drive.

5. The expansion module of claim 1, wherein the standard data connector is a standard USB 2.0 data connector.

6. The expansion module of claim 1, wherein the alignment receptacle is positioned to receive an alignment pin in a direction parallel with the standard data connector and the power connector.

7. The expansion module of claim 1, further comprising:
a cooling device positioned within the housing interior, wherein the cooling device receives power from the interface device, and wherein the cooling device is aligned with another of the at least two throughholes of the end cap.

8. The expansion module of claim 1, wherein the alignment receptacle is positioned off-center of the end cap.

9. The expansion module of claim 1, wherein the end cap further includes another alignment receptacle.

10. The expansion module of claim 1, wherein the alignment receptacle is a shaped depression extending toward the interior of the housing.

11. The expansion module of claim 1, wherein the alignment receptacle extends farther into the housing interior than the greater depth of the standard data connector and the power connector.

12. The expansion module of claim 1, wherein at least a portion of the interface device is positioned in the end cap.

13. An expansion module bay for receiving an expansion module, comprising:
a module sleeve having an opening for receiving an expansion module at least partially into the interior of the module sleeve;
a connector connected to an external face of the module sleeve and arranged to connect through the module sleeve to a received expansion module;
an alignment pin positioned adjacent to the connector and arranged to connect to one end of the module sleeve and adapted to align the received expansion module within the expansion module bay; and
a door covering the module receiving opening of the module sleeve.

14. The expansion module bay of claim 13, wherein the module sleeve is adapted to receive an expansion module, the expansion module comprising:
- a housing having an interior and an exterior;
- an end cap connected to the housing at one end, wherein the end cap includes at least two throughholes to the interior of the housing and an alignment receptacle positioned adjacent to the at least two throughholes; and
- an interface device positioned in the housing interior, wherein the interface device receives a) a standard data connector via one of the at least two throughholes of the end cap and b) a power connector via another of the at least two throughholes of the end cap, and wherein the interface device includes one or more expansion device connectors internal to the housing interior for providing at least one of data signals and power received from the standard data connector and the power connector to an expansion device.

15. The expansion module bay of claim 14, wherein the alignment receptacle is a shaped depression extending toward the interior of the housing.

16. The expansion module bay of claim 14, wherein the alignment receptacle extends farther into the housing interior than the greater depth of the standard data connector and the power connector.

17. The expansion module bay of claim 14, wherein at least a portion of the interface device is positioned in the end cap.

18. The expansion module bay of claim 13, wherein the connector includes a data connector and a power connector.

19. The expansion module bay of claim 18, wherein the data connector is a standard USB Type B data connector.

20. The expansion module bay of claim 13, wherein the alignment pin is positioned off-center of the end of the module sleeve.

21. The expansion module bay of claim 13, further comprising:
- another alignment pin connected to one end of the module sleeve and adapted to align the received expansion module within the expansion module bay.

22. The expansion module bay of claim 13, wherein the connector is positioned at the end opposite the expansion module receiving opening of the module sleeve.

23. The expansion module bay of claim 13, wherein the connector further comprises:
- the alignment pin protruding through the module sleeve and adapted to align the received expansion module within the expansion module bay.

24. The expansion module bay of claim 23, wherein the alignment pin is positioned off-center of the end of the module sleeve.

25. The expansion module bay of claim 23, wherein the connector further comprises:
- another alignment pin protruding through the module sleeve and adapted to align the received expansion module within the expansion module bay.

26. The expansion module bay of claim 13, wherein the alignment pin is arranged to secure the connector to the module sleeve.

27. The expansion module bay of claim 13, wherein the connector comprises:
- a fastening device arranged to attach the connector to an external face of the module sleeve.

28. The expansion module bay of claim 13, wherein the alignment pin extends from an external face of the module sleeve to an internal region of the module sleeve.

* * * * *